United States Patent
So

(10) Patent No.: US 7,299,747 B2
(45) Date of Patent: Nov. 27, 2007

(54) FOOD PULPIFIER

(76) Inventor: Kwok Kuen So, 2nd Floor, Chuan Yuan Factory Building 342-344 Kwun Tong Road, Kwun Tong, Kowloon (HK)

( * ) Notice: Subject to any disclaimer, the term of this patent is extended or adjusted under 35 U.S.C. 154(b) by 0 days.

(21) Appl. No.: 11/353,993

(22) Filed: Feb. 15, 2006

(65) Prior Publication Data

US 2006/0192042 A1    Aug. 31, 2006

(30) Foreign Application Priority Data

Feb. 25, 2005   (EP) .................... 05251125

(51) Int. Cl.
  *B30B 7/00*   (2006.01)
  *B30B 9/06*   (2006.01)
  *A47J 19/04*  (2006.01)

(52) U.S. Cl. .............. 100/234; 100/110; 100/126; 100/243; 99/495; 99/506; 241/95; 241/169; 241/169.2; D7/666

(58) Field of Classification Search ........... 100/104, 100/110, 116, 125, 126, 132, 234, 243; 99/495, 99/506–511; 220/23.6, 23.2, 4.27, 324, 326; 206/503, 509; 241/169.2, 95, 169; D7/665, D7/666, 680

See application file for complete search history.

(56) References Cited

U.S. PATENT DOCUMENTS

| 1,088,128 A | * | 2/1914 | Browning ................. 211/47 |
| 1,128,732 A | * | 2/1915 | Steinbach ............ 100/229 R |
| 6,257,439 B1 | * | 7/2001 | Hsu ....................... 220/759 |

FOREIGN PATENT DOCUMENTS

| DE | 164701 | 7/1904 |
| DE | 959405 | 9/1956 |
| DE | 3400897 A1 | * 7/1985 |
| DE | 8529636 U | 2/1986 |
| DE | 35 13 891 | 10/1986 |
| DE | 88 03 918 U | 6/1988 |
| DE | 201 12 638 U | 3/2002 |
| FR | 614257 | * 12/1926 |
| JP | 2005304808 A | * 11/2005 |

* cited by examiner

*Primary Examiner*—Jimmy Nguyen
(74) *Attorney, Agent, or Firm*—Leydig, Voit & Mayer, Ltd.

(57) ABSTRACT

A pulpifier includes a holder having a compartment and a rear handle. A perforated screen is located in the compartment. A presser extends into the compartment and moves towards the screen. A front clamp extends from the holder for affixing the holder to a vessel supporting the pulpifier.

18 Claims, 7 Drawing Sheets

FOOD PULPIFIER

The present invention relates to a pulpifier for vegetable or fruit or the like.

BACKGROUND OF THE INVENTION

More particularly, although not exclusively, the invention relates to a manual potato masher having a clamp by which it can be affixed to a bowl or saucepan.

Potato mashers are known to comprise a compartment having or containing a perforated screen against and through which cooked potato pieces are pressed by a presser and extruded. Such mashers do not lend themselves to being conveniently supported at the opening of a vessel such as a bowl or saucepan, so that both hands can be used for purposes other than holding the masher in position.

OBJECT OF THE INVENTION

It is an object of the present invention to overcome or substantially ameliorate the above disadvantage and/or more generally to provide an improved pulpifier.

SUMMARY OF THE INVENTION

According to the invention, there is provided a pulpifier, comprising:
a holder having a compartment and a handle,
a perforated screen at the compartment,
a presser extendable into the compartment and movable towards the screen, and
a clamp extending from the holder and serving as a means by which the holder can be affixed to a vessel when supported thereon.

Preferably, the pulpifier further comprises a lever hingedly connected to the holder and from which the presser extends.

More preferably, the presser is pivotally attached to the lever.

It is preferred that the screen is detachable from the holder.

It is preferred that the clamp comprises an arm having a lip to bear against and outside edge of a vessel rim, and a tongue biased toward the lip for bearing against an inside edge of the vessel rim.

Preferably, the tongue extends downwardly from the arm further than the lip.

More preferably, the tongue is formed upon a slider that is movable linearly within the arm.

More preferably, the pulpifier further comprises a spring located within the slider and biasing the tongue away from the vessel.

More preferably, the pulpifier further comprises a cover plate attached to the arm to conceal the slider.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
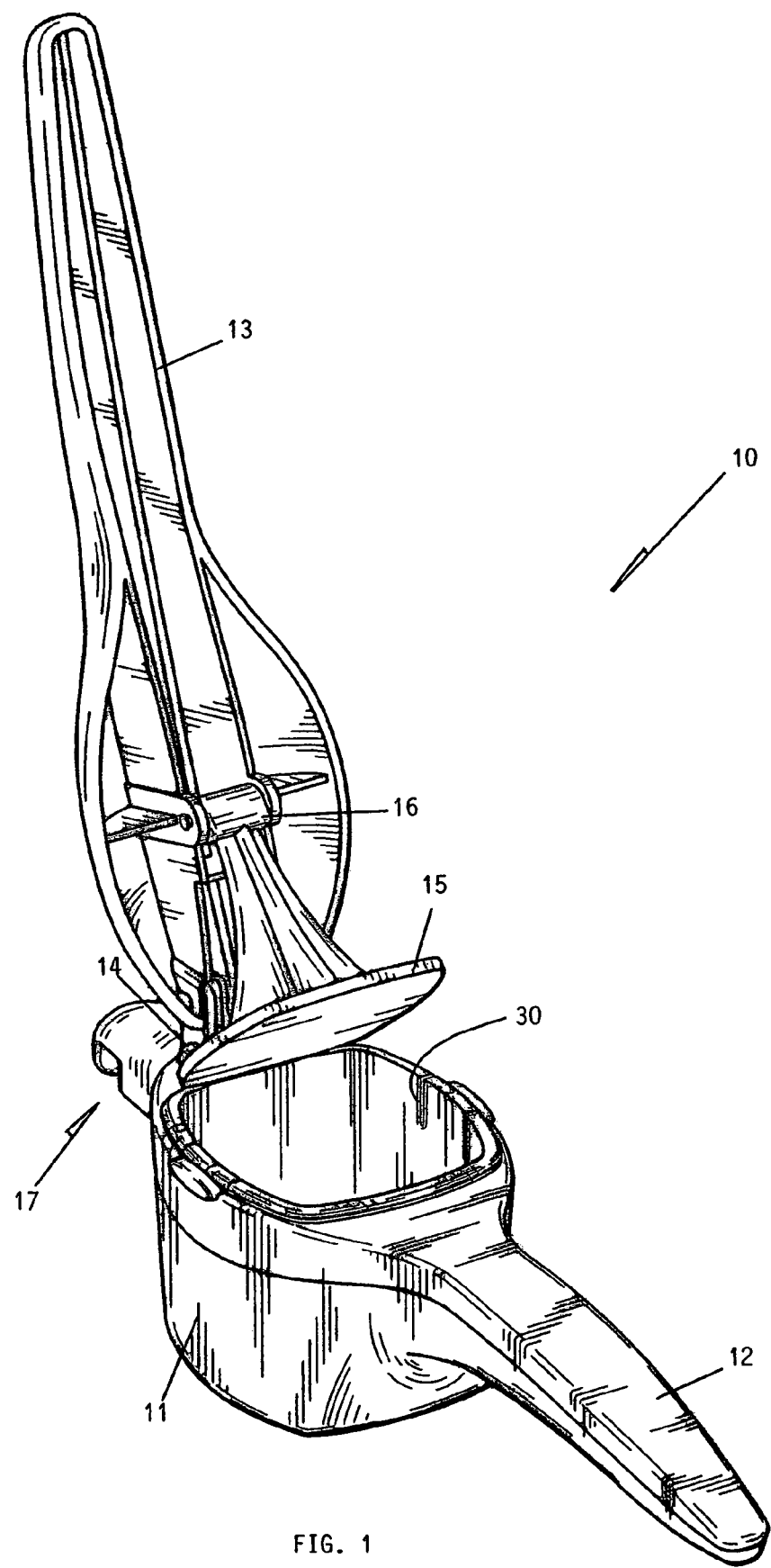
FIG. 1 is a perspective view of an embodiment of a pulpifier in the form of a potato masher, in accordance with the invention, in an open configuration.
Figure 2:
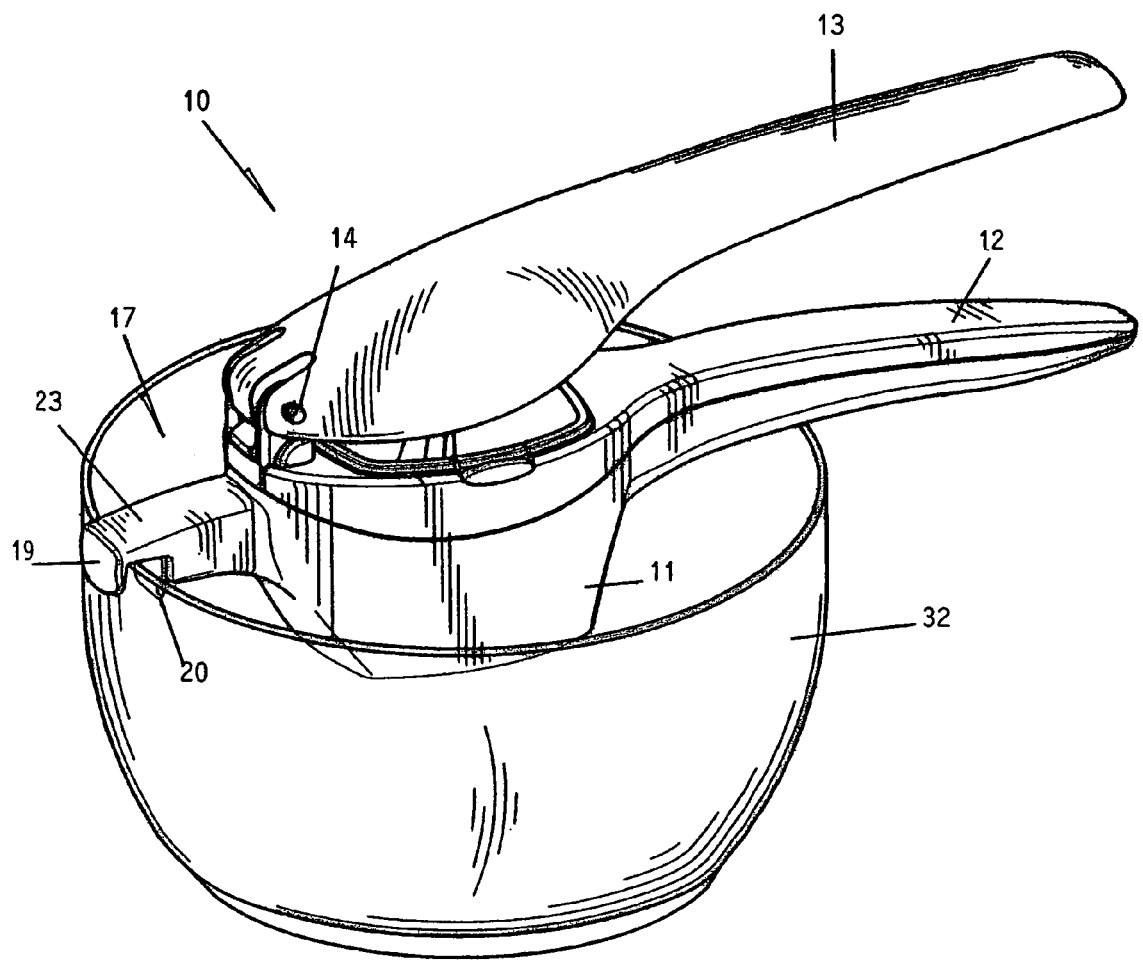
FIG. 2 is a perspective view of the potato masher of FIG. 1 in a closed configuration, supported across the opening of a bowl.

Referring to the drawings, there is shown a pulpifier embodying the invention in the form of a potato masher 10. The potato masher 10 is typically formed of cast metal or moulded plastics material and comprises a holder 11 defining a compartment 30 within which a flat perforated screen 18 is detachably fitted. Extending rearwardly from the compartment 30 is a handle 12. Attached at a front hinge 14 to the holder 11 is an upper lever 13. A presser 15 is connected to the lever 13 at a pivot 16 and extends downwardly into the compartment 30 so that its flat surface moves toward the screen 18.

There is a clamp 17 on the holder 11 diametrically opposite the handle 12. The clamp 17 comprises an arm 23 that is formed integrally with the holder 11. At the distal end of the arm 23, there is a lip 19 which in use bears against the outside surface 24 of a bowl 32 on which the potato masher 10 is supported. The clamp 17 further comprises a tongue 20 formed at the end of the slider 21 that fits lengthwise within the arm 23. A coil spring 25 is located within the slider 21, which biases the slider 21 and hence the tongue 20 to move linearly towards the lip 19. The slider 21 and spring 25 are concealed above a cover plate 26 that is screwed to the arm 23.

Figure 3:
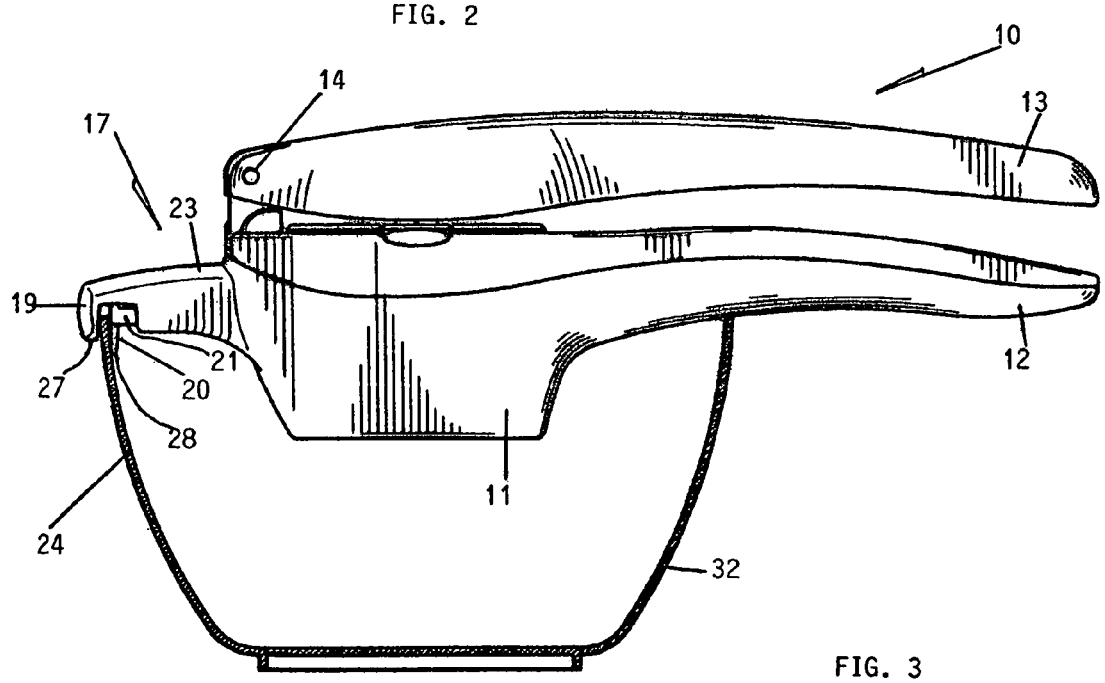
FIG. 3 is a cross-sectional view of the potato masher and bowl of FIG. 2.
Figure 4:
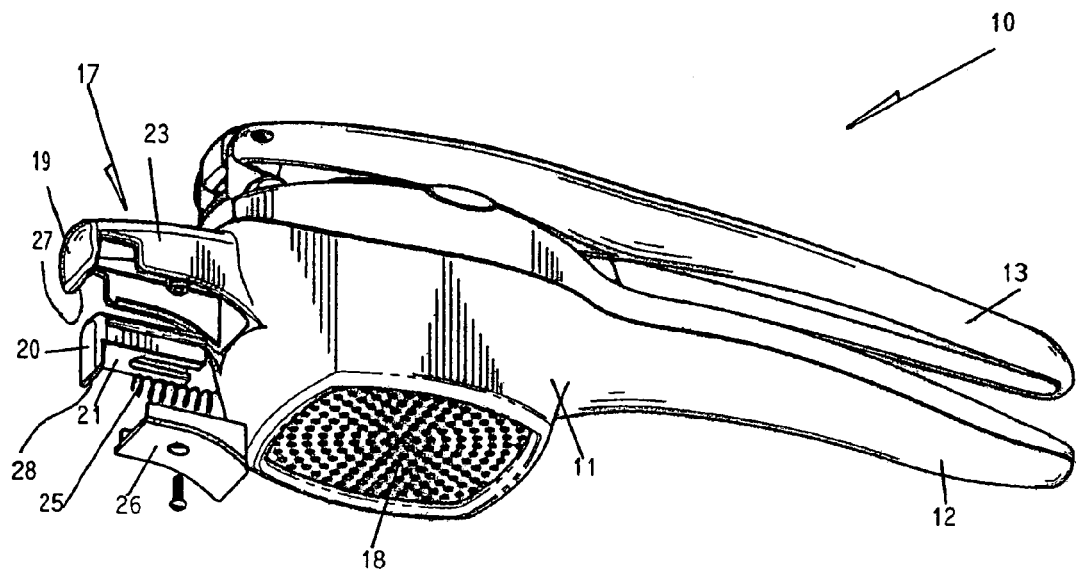
FIG. 4 is a partially parts-exploded perspective view of the potato masher of FIG. 2 from below.
Figure 5:
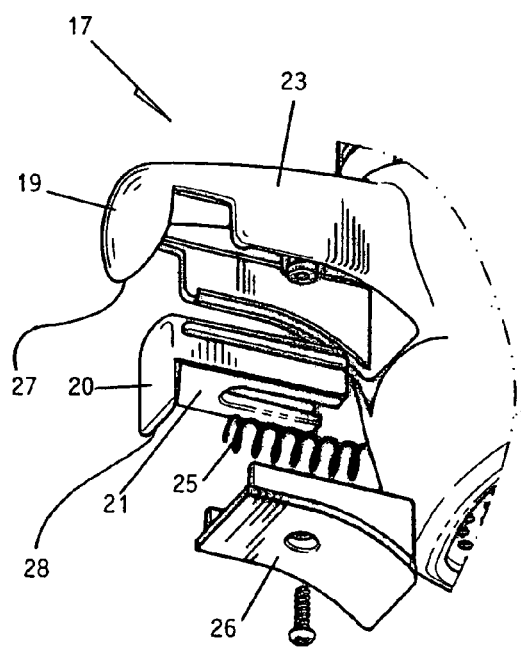
FIG. 5 is a parts-exploded perspective view of a clamping device of the potato masher of FIG. 4.
Figure 6:
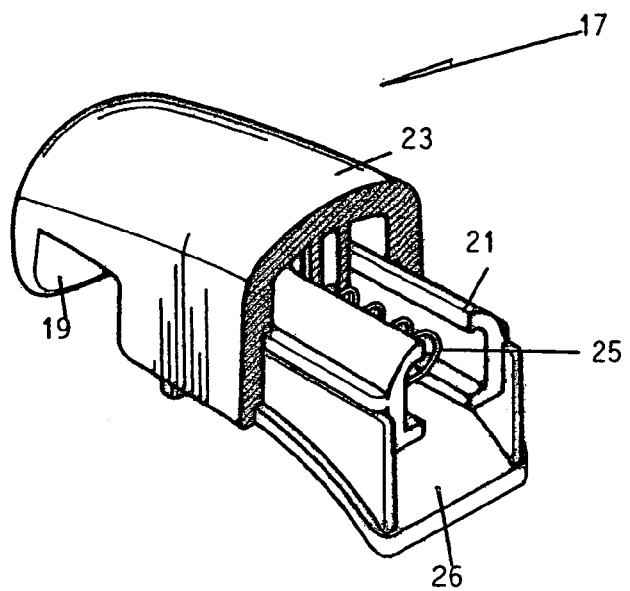
FIG. 6 is a cut-away perspective view of the clamping device of FIG. 5.
Figure 7:
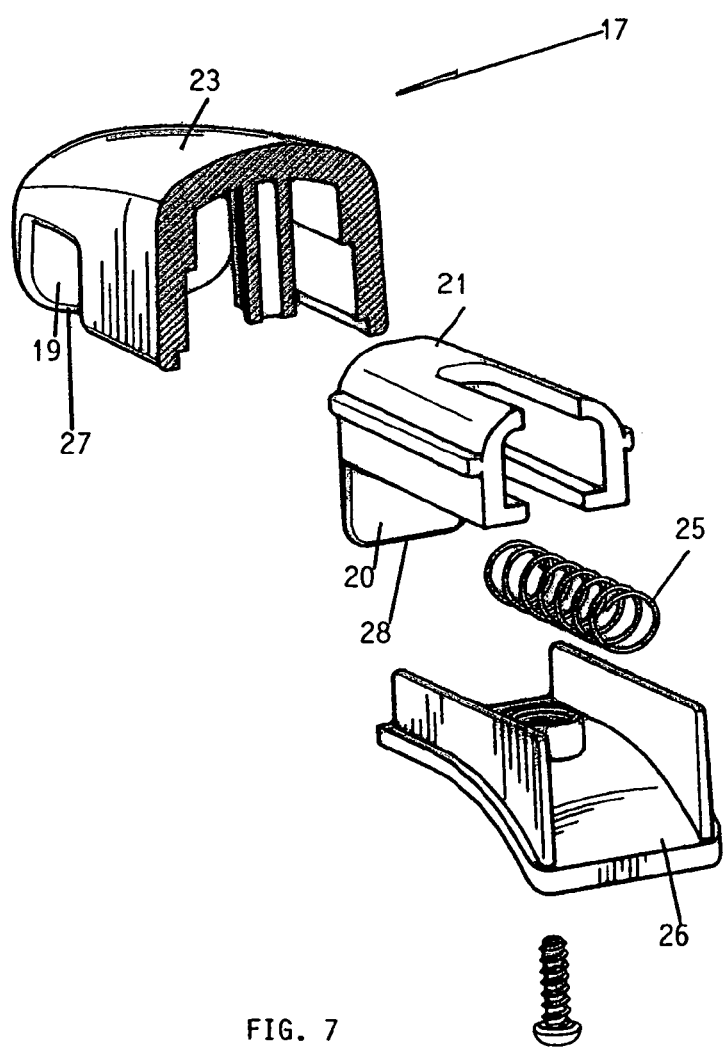
FIG. 7 is a cut-away parts-exploded perspective view of the clamping device of FIG. 6.
Figure 12:
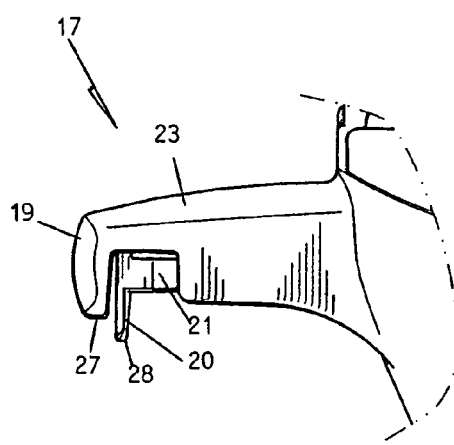
FIG. 12 is a side view of the clamping device of FIG. 11 in a first configuration.
Figure 13:
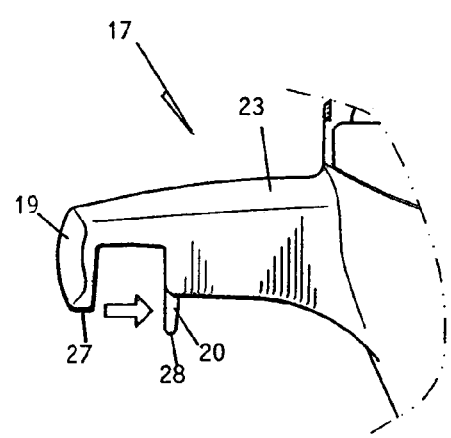
FIG. 13 is a side view of the clamping device of FIG. 11 in a second configuration.
Figure 14:
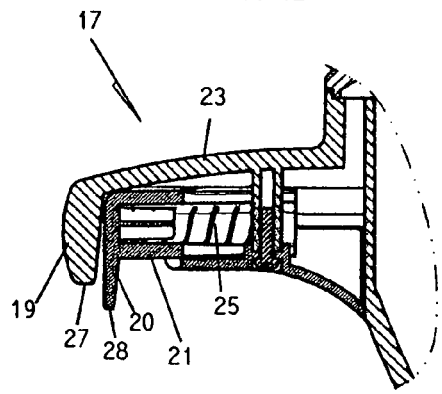
FIG. 14 is a cross-sectional view of the clamping device of FIG. 12 in the first configuration.
Figure 15:
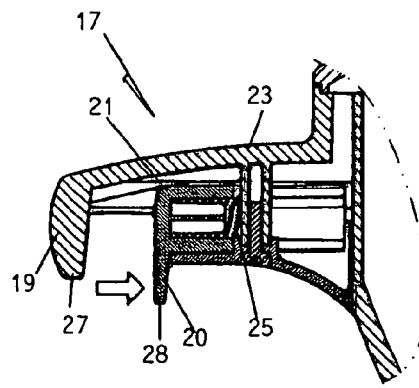
FIG. 15 is a cross-sectional view of the clamping device of FIG. 13 in the second configuration.
Figure 17:
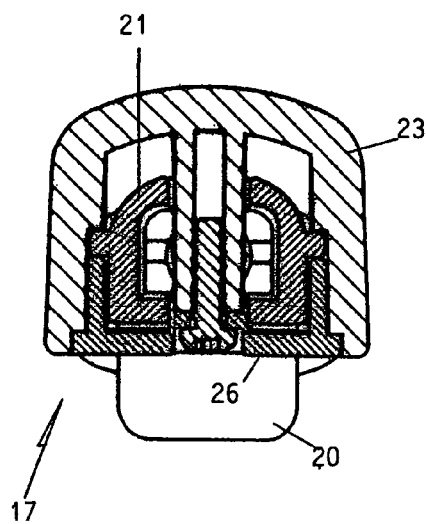
FIG. 17 is a cross-sectional view of the clamping device of the potato masher taken along line XVII-XVII of FIG. 16.
Figure 18:
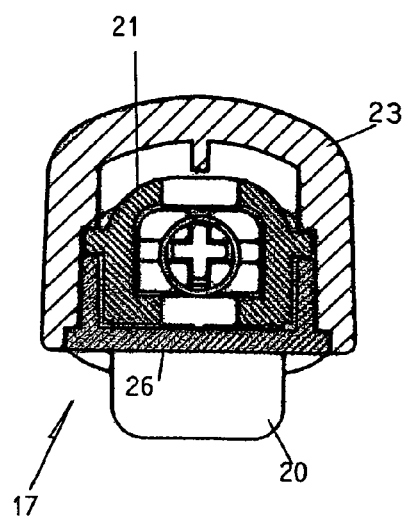
FIG. 18 is a cross-sectional view of the clamping device of the potato masher taken along line XVIII-XVIII of FIG. 16.
Figure 16:
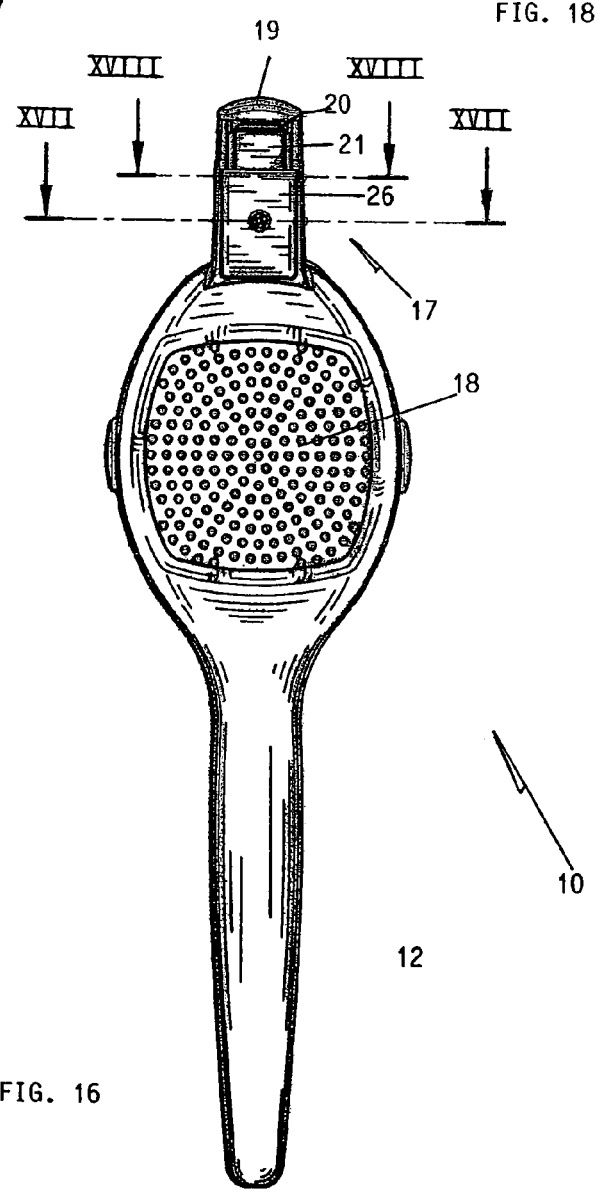
FIG. 16 is an inverted plan view of the potato masher of FIG. 1.

As shown in FIGS. 3 and 12 for example, the bottom extremity 28 of the tongue 20 depends to a level that is lower than that of the bottom extremity 27 of the lip 19. This makes it easy to attach the clamp 17 to the edge of the bowl 32 by simply pressing the tongue 20 against the inside surface of the bowl's rim 33 as the lip 19 clips over the rim 33 to bear against its outside surface.

Figure 8:
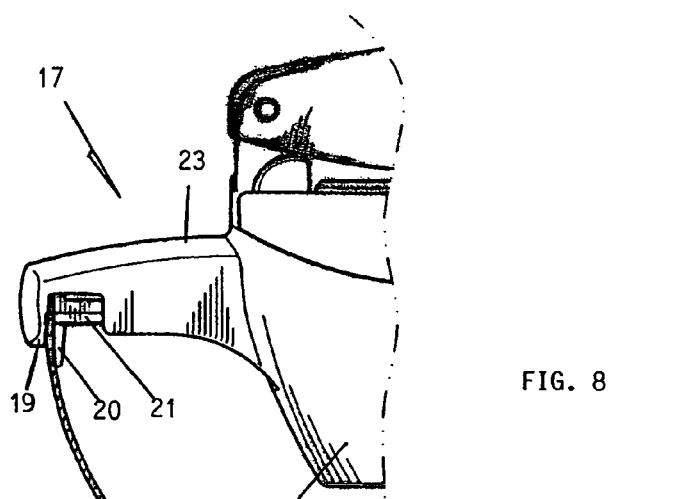
FIGS. 8 to 10 are partial cross-sectional views of the clamping device of FIG. 5, attached to bowls having a variety of upper edge configurations.
Figure 9:
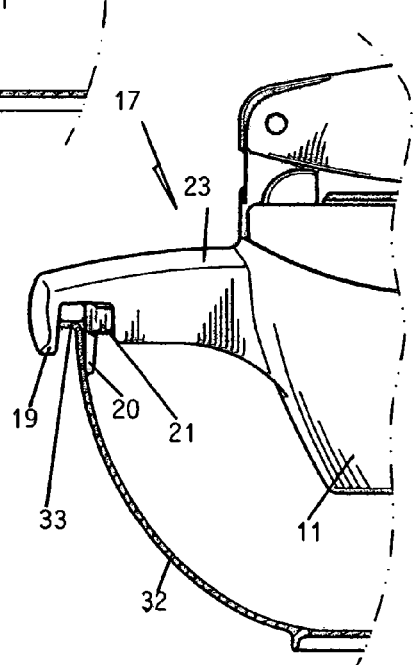
Figure 10:
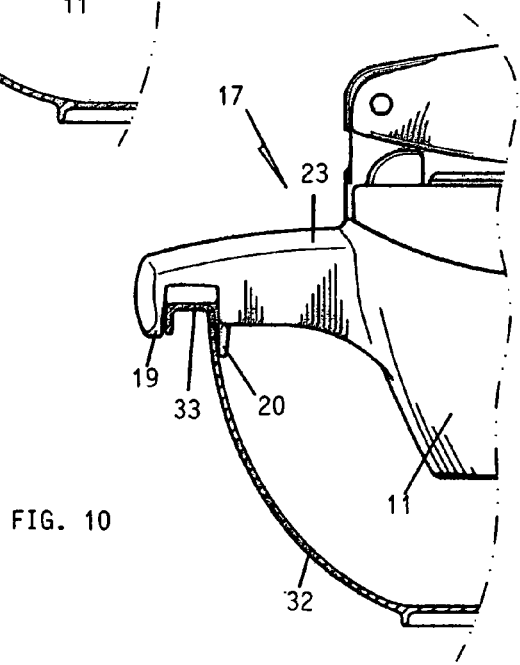
Figure 11:
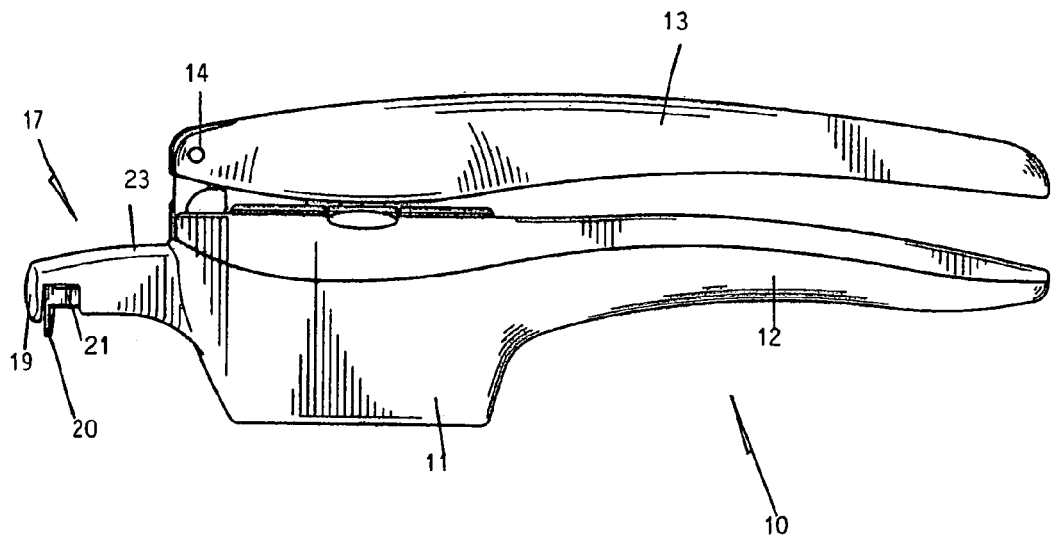
FIG. 11 is a side view of the potato masher of FIG. 1.

The clamping width of the clamp 17 is variable, by reason of the tongue 20 carried by the slider 21 being slidable and spring-loaded towards the lip 19, to suit a certain range of rim thickness of kitchen vessels, as illustrated in FIGS. 8 to 10.

It should be appreciated that modifications and alterations obvious to those skilled in the art are not be considered as beyond the scope of the present invention.

For example, the bottom extremity 27 of the lip 19 might extend lower than the bottom extremity 28 of the tongue 20 so that fitting of the clamp 17 to the rim of a bowl would be achieved by pressing the lip 19 against the outside surface of the bowl's rim 33 as the tongue 20 clips over the rim to bear against its inside surface. A further option would be to position the tongue 20 outward of the lip 19 and provide a tension spring to draw the tongue 20 toward the lip 19 and the bowl 32.

The invention claimed is:

1. A pulpifier comprising:
   a holder having a compartment and a handle,
   a perforated screen at the compartment,
   a presser extendable into the compartment and movable towards the screen, and
   a clamp extending from the holder for affixing the holder to a vessel supporting the pulpifier, wherein the clamp comprises
      an arm having a lip for bearing against an outside surface of a vessel rim,
      a tongue resiliently biased toward the lip for pressing against an inside surface of the vessel rim, and a slider that is movable linearly within the arm, wherein the tongue extends from the slider.

2. The pulpifier as claimed in claim 1, further comprising a lever hingedly connected to the holder and from which the presser extends.

3. The pulpifier as claimed in claim 2, wherein the presser is pivotally attached to the lever.

4. A pulpifier comprising:
   a holder having a compartment and a handle,
   a perforated screen at the compartment,
   a presser extendable into the compartment and movable towards the screen, and
   a clamp extending from the holder for affixing the holder to a vessel supporting the pulpifier, wherein the clamp comprises
      an arm having a lip for bearing against an outside surface of a vessel rim, and
      a tongue resiliently biased toward the lip for pressing against an inside surface of the vessel rim, wherein the lip and the tongue are transverse to the arm and the tongue extends farther from the arm than the lip does.

5. The pulpifier as claimed in claim 1, further comprising a spring located within the slider and biasing the tongue toward the lip.

6. The pulpifier as claimed in claim 5, further comprising a cover plate attached to the arm and concealing the slider.

7. A pulpifier comprising:
   a holder having a compartment and a handle,
   a perforated screen at the compartment,
   a presser extendable into the compartment and movable towards the screen, and
   a clamp extending from the holder for affixing the holder to a vessel supporting the pulpifier, the clamp including
      an arm having a lip for bearing against an outside surface of a vessel rim, and
      a tongue biased toward the lip for bearing against an inside surface of the vessel rim,
      a slider that is linearly movable within the arm, wherein the tongue extends from the slider, and
      a spring located within the slider and biasing the tongue toward the lip.

8. The pulpifier as claimed in claim 7, further comprising a lever hingedly connected to the holder and from which the presser extends.

9. The pulpifier as claimed in claim 8, wherein the presser is pivotally attached to the lever.

10. A pulpifier comprising:
    a holder having a compartment and a handle,
    a perforated screen at the compartment,
    a presser extendable into the compartment and movable towards the screen, and
    a clamp extending from the holder for affixing the holder to a vessel supporting the pulpifier, the clamp including
       an arm having a lip for bearing against an outside surface of a vessel rim, and
       a tongue biased toward the lip for bearing against an inside surface of the vessel rim,
       a slider that is linearly movable within the arm, wherein the tongue extends from the slider, and
       a spring located within the slider and biasing the tongue toward the lip, wherein the lip and the tongue are transverse to the arm and the tongue extends farther from the arm than the lip does.

11. The pulpifier as claimed in claim 7, further comprising a cover plate attached to the arm and concealing the slider.

12. A pulpifier comprising:
    a holder having a compartment and a handle,
    a perforated screen at the compartment,
    a presser extendable into the compartment and movable toward the screen,
    a lever hingedly connected to the holder, from which the presser extends, and rotating relative to the holder about an axis, and
    a clamp extending from the holder for affixing the holder to a vessel supporting the pulpifier, the clamp including
       an arm having a lip for bearing against an outside surface of a vessel rim,
       a tongue for bearing against an inside surface of the vessel rim, the tongue being slidable toward and away from the lip along a direction transverse to the axis about which the lever rotates, and being biased toward the lip, and a slider from which the tongue extends, the slider slidingly linearly within the arm.

13. The pulpifier as claimed in claim 12, wherein the presser is pivotally attached to the lever.

14. A pulpifier comprising:
    a holder having a compartment and a handle,
    a perforated screen at the compartment,
    a presser extendable into the compartment and movable toward the screen,
    a lever hingedly connected to the holder, from which the presser extends, and rotating relative to the holder about an axis, and
    a clamp extending from the holder for affixing the holder to a vessel supporting the pulpifier, the clamp including
       an arm having a lip for bearing against an outside surface of a vessel rim, and
       a tongue for bearing against an inside surface of the vessel rim, the tongue being slidable toward and away from the lip along a direction transverse to the axis about which the lever rotates, and being biased toward the lip, wherein the lip and the tongue are transverse to the arm and the tongue extends farther from the arm than the lip does.

15. The pulpifier as claimed in claim 12, further comprising a spring located within the slider and biasing the tongue toward the lip.

16. The pulpifier as claimed in claim 1, wherein the handle extends from a side of the compartment, the arm extends from a side of the compartment opposite the handle, the lip is located at a distal end of the arm, and the tongue is located between the lip and the compartment and resiliently biased away from the compartment.

17. The pulpifier as claimed in claim 7, wherein the handle extends from a side of the compartment, the arm extends from a side of the compartment opposite the handle, the lip is located at a distal end of the arm, and the tongue is located between the lip and the compartment and resiliently biased away from the compartment.

18. The pulpifier as claimed in claim 12, wherein the handle extends from a side of the compartment, the arm extends from a side of the compartment opposite the handle, the lip is located at a distal end of the arm, and the tongue is located between the lip and the compartment and resiliently biased away from the compartment.

* * * * *